United States Patent
Okamoto et al.

(10) Patent No.: US 10,623,270 B2
(45) Date of Patent: Apr. 14, 2020

(54) NON-TRANSITORY COMPUTER READABLE MEDIUM, IMAGE PROCESSING APPARATUS, AND IMAGE PROCESSING METHOD

(71) Applicant: FUJI XEROX CO., LTD., Tokyo (JP)

(72) Inventors: Hiroshi Okamoto, Kanagawa (JP); Xule Qiu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 294 days.

(21) Appl. No.: 15/692,373

(22) Filed: Aug. 31, 2017

(65) Prior Publication Data
US 2018/0227189 A1 Aug. 9, 2018

(30) Foreign Application Priority Data
Feb. 3, 2017 (JP) ................. 2017-018450

(51) Int. Cl.
*H04L 12/24* (2006.01)
*H04L 12/26* (2006.01)
*G06F 3/12* (2006.01)

(52) U.S. Cl.
CPC .......... *H04L 41/142* (2013.01); *G06F 3/1218* (2013.01); *G06F 3/1236* (2013.01); *G06F 3/1285* (2013.01); *H04L 43/50* (2013.01); *H04L 41/0893* (2013.01); *H04L 41/12* (2013.01)

(58) Field of Classification Search
CPC ... H04L 41/142; H04L 43/50; H04L 41/0893; H04L 41/12; G06F 3/1218; G06F 3/1236; G06F 3/1285
See application file for complete search history.

(56) References Cited

U.S. PATENT DOCUMENTS

| | | | |
|---|---|---|---|
| 8,965,816 B2 | 2/2015 | Okamoto | |
| 9,690,969 B2 | 6/2017 | Okamoto | |
| 2010/0315959 A1* | 12/2010 | Lin | H04L 41/145 370/250 |
| 2015/0012658 A1* | 1/2015 | Elmore | H04L 65/4084 709/226 |
| 2016/0335545 A1 | 11/2016 | Qiu et al. | |

(Continued)

FOREIGN PATENT DOCUMENTS

| | | |
|---|---|---|
| JP | 2013-168127 A | 8/2013 |
| JP | 2016-029526 A | 3/2016 |
| JP | 2016-218531 A | 12/2016 |

OTHER PUBLICATIONS

Newman, M.E.J., "Communities, modules and large-scale structure in networks," Nature Physics, Jan. 2012, pp. 25-31, vol. 8.

(Continued)

*Primary Examiner* — Viet D Vu
(74) *Attorney, Agent, or Firm* — Oliff PLC

(57) ABSTRACT

An information processing apparatus includes an acquisition unit that acquires information related to a network including a group of nodes, and a group of real links that connects the nodes, an adding unit that generates an extension network by adding to the network at least a virtual link that link nodes that are not linked by a real link, and a clustering unit that clusters the group of the nodes by iteratively calculating a stochastic process of a transition between the nodes linked by the real link and the virtual link in the extension network until the stochastic process is regarded to be in a steady state.

4 Claims, 3 Drawing Sheets

(56) References Cited

U.S. PATENT DOCUMENTS

2017/0012848 A1* 1/2017 Zhao .................... H04L 41/145
2017/0026232 A1* 1/2017 Janardhanan ........... H04L 49/30
2017/0302572 A1* 10/2017 Izhak-Ratzin ...... H04L 41/0896

OTHER PUBLICATIONS

Fortunato, Santo, "Community detection in graphs," Physics Reports, 2010, pp. 75-174, vol. 486.

* cited by examiner

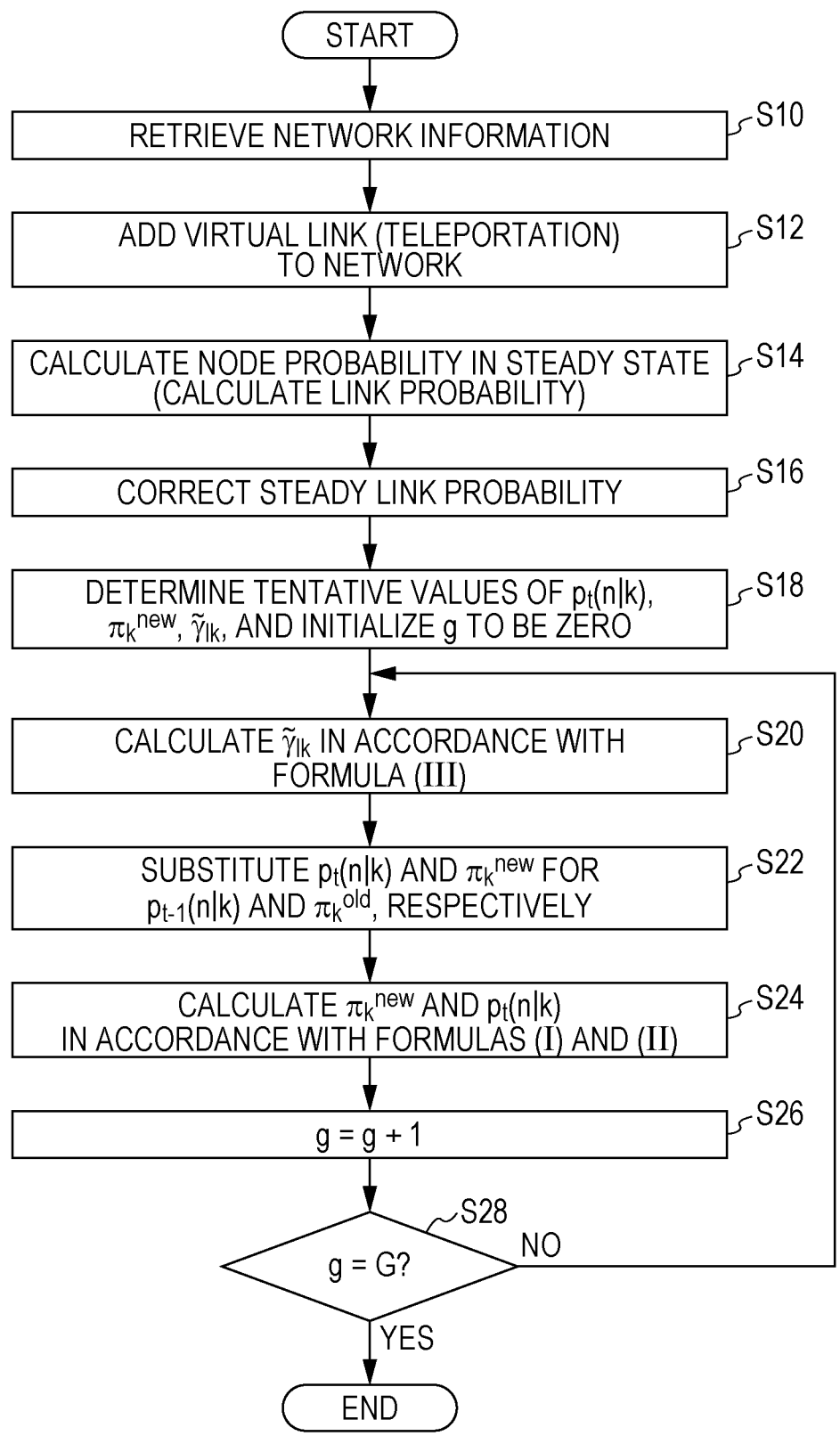

NON-TRANSITORY COMPUTER READABLE MEDIUM, IMAGE PROCESSING APPARATUS, AND IMAGE PROCESSING METHOD

CROSS-REFERENCE TO RELATED APPLICATIONS

This application is based on and claims priority under 35 USC 119 from Japanese Patent Application No. 2017-018450 filed Feb. 3, 2017.

BACKGROUND

(i) Technical Field

The present invention relates to a non-transitory computer readable medium, an image processing apparatus, and an image processing method.

(ii) Related Art

In a clustering method, a clustering operation is performed on a network by iterating calculation of a stochastic process, such as Markov chain. In this clustering method, however, iterative calculations may take a longer period of time (or higher calculation costs) to converge to a steady state. In particular, when a cluster has a non-clique structure, this problem may frequently occur. If plural nodes are linked solidly to each other, these nodes are referred as forming a clique. In a clique, any one node is linked to another node via a one link. If a cluster has a structure opposite to this feature (if the number of links that link one node to another node is larger), this cluster is referred to as "being non-clique".

Iterative calculations of the stochastic process are performed as propagation of a probability over a network. By analogy with physics, the iterative calculations are actually a diffusion process along a link in the network (such as Brownian motion or a random walk). The convergence of a probability distribution to a steady state is achieved after probabilities flow out through links from the nodes and then sufficiently diffuse through the network and are then mixed. If a community has a non-clique structure, a probability flowing out from one node may arrive at another node after passing through a large number of nodes. For this reason, a longer period of time is taken before the probabilities flow out from the nodes via the links, sufficiently diffuse and are then mixed in the network. If the network has a non-clique structure, experience indicates that the probability frequently reaches a false steady state before being sufficiently mixed.

SUMMARY

According to an aspect of the invention, there is provided an information processing apparatus. The information processing apparatus includes an acquisition unit that acquires information related to a network including a group of nodes, and a group of real links that connects the nodes, an adding unit that generates an extension network by adding to the network at least a virtual link that link nodes that are not linked by a real link, and a clustering unit that clusters the group of the nodes by iteratively calculating a stochastic process of a transition between the nodes linked by the real link and the virtual link in the extension network until the stochastic process is regarded to be in a steady state.

BRIEF DESCRIPTION OF THE DRAWINGS

Exemplary embodiments of the present invention will be described in detail based on the following figures, wherein:

FIG. 3 illustrates an example of a process of the apparatus of the exemplary embodiment.

DETAILED DESCRIPTION

An exemplary embodiment of the present invention is described with reference to the drawings.

Figure 1:
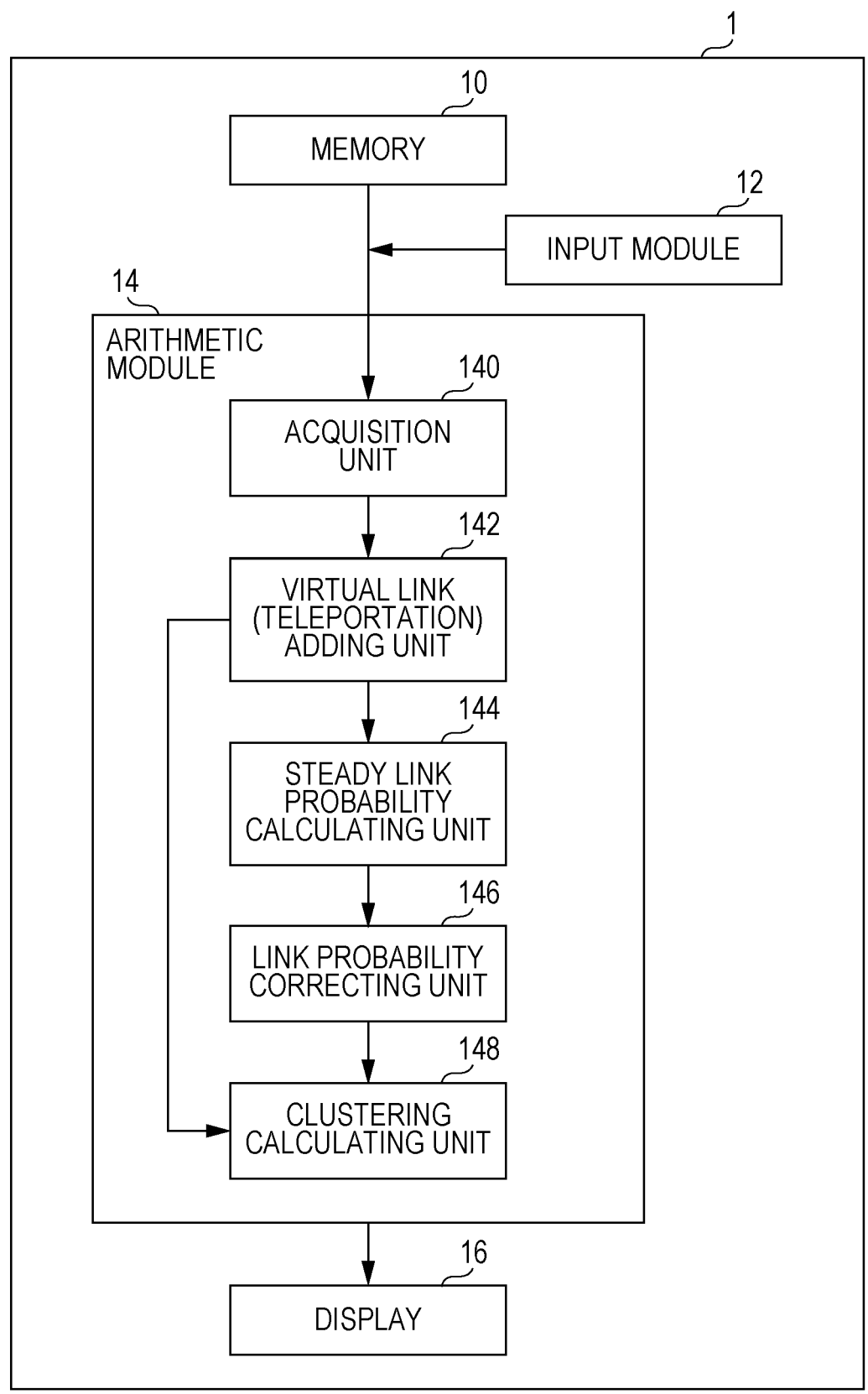
FIG. 1 illustrates a configuration of an apparatus of an exemplary embodiment.

FIG. 1 illustrates a configuration of an image processing apparatus 1 of the exemplary embodiment of the present invention. The image processing apparatus 1 includes a memory 10, an input module 12, an arithmetic module 14, and a display 16.

The memory 10 includes a random-access memory (RAM), and a read-only memory (ROM). The memory 10 stores a program executed by the arithmetic module 14 and serves as a working memory of the arithmetic module 14. The program stored on the memory 10 and executed by the arithmetic module 14 may be provided through an electronic communication network, or may be provided in a stored state on a computer readable non-transitory information recording medium, such as a semiconductor storage element.

The memory 10 in the image processing apparatus 1 of the exemplary embodiment stores network information. The network information indicates a network that includes plural nodes, and plural links that connect the plural nodes. The network indicated by the network information may be any network. For example, the network may be a network implemented by hypertext, or a network of friends. It is sufficient if the network information indicates at least a linkage relationship between nodes (a relationship between a node and a link). The network information does not necessarily have to include specific content contained in a node (content such as hypertext markup language (HTML) data).

The input module 12 may be a keyboard and a mouse, and sends an instruction from a user to the arithmetic module 14.

The arithmetic module 14 includes a central processing unit (CPU), for example, and performs an arithmetic process for clustering a network (extracting a community) by executing the program stored on the memory 10. In terms of functionality, the arithmetic module 14 includes an acquisition unit 140, a virtual link adding unit 142, a steady link probability calculating unit 144, a link probability correcting unit 146, and a clustering calculating unit 148. The arithmetic process for clustering performed by the arithmetic module 14 is described in detail below.

The display 16 displays, to a user, information processed by the arithmetic module 14, and may be a liquid-crystal display.

The arithmetic module 14 is further described in detail below.

The acquisition unit 140 in the arithmetic module 14 retrieves information, such as the network information, from the memory 10.

The virtual link adding unit 142 adds a virtual link to a network represented by the retrieved network information.

The virtual link is implemented separately from a link forming the network (this link is referred to as a real link to discriminate it from the virtual link). The virtual link adding unit 142 may add a virtual link in order to link nodes between which there is no real link or between which a real link is extended. In one example, among individual nodes, a virtual node is added between a node of interest (self node) and each of the nodes (including the self node). If the number of nodes is N in the network, N virtual links are added to one node. If the virtual link adding unit 142 adds virtual links to a network represented by the network information, another network results and is referred to as an extension network.

Figure 2:
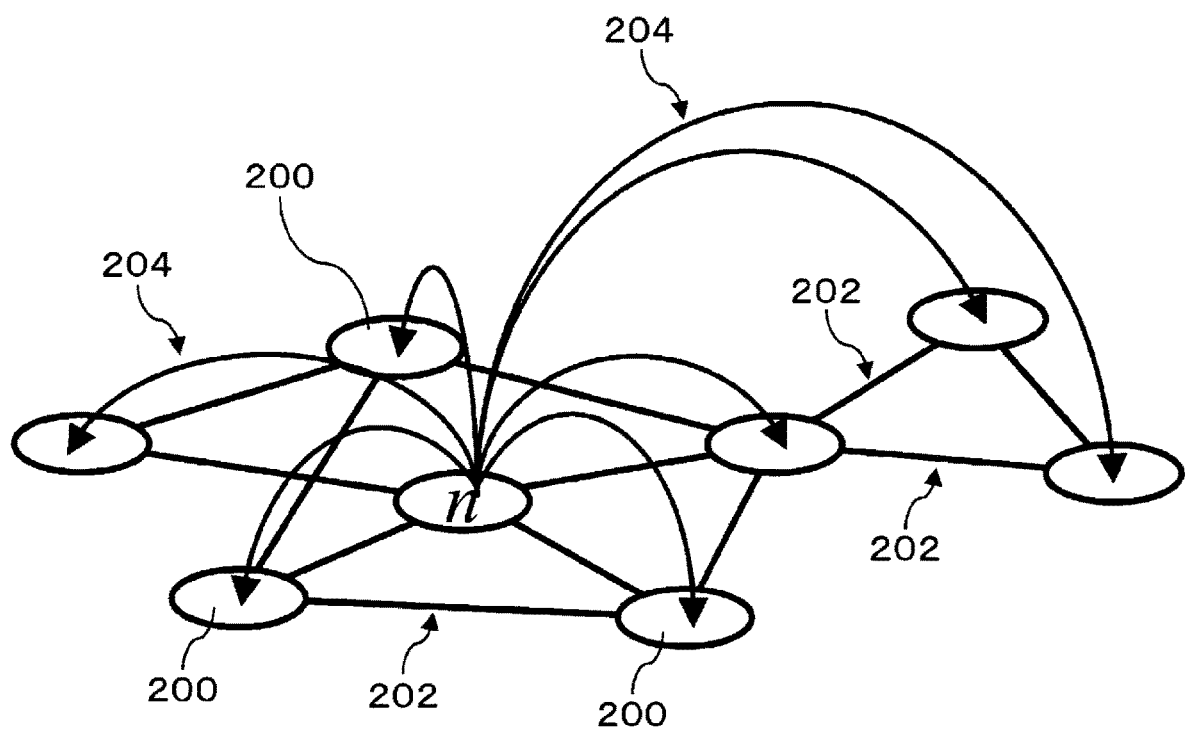
FIG. 2 illustrates a virtual link (teleportation)

FIG. 2 diagrammatically illustrates a network and virtual links. In this example, the network including nodes 200 in elliptical shape connected by straight-line real links 202 is an original network represented by the network information. This network is not a clique (in other words, among pairs of nodes in the network, some pairs are without real link 202 therebetween). Each virtual link 204 is represented by an arrow-headed curve as illustrated in FIG. 2. For convenience of explanation, only virtual links 204 originated at a node "n" are illustrated. A virtual link originated at the node "n" and connected to the node "n" is not illustrated. In this example, a virtual link is added to link a node of interest (self node) and each of the nodes in the network (including the self node). Concerning a node other than the node "n", a virtual link extended from that node to each of the nodes is added. A network including a node group 200 and a real link group 202, represented by the network information, and a virtual link group 204 added by the virtual link adding unit 142 is an extension network. In this example, the virtual link is an effective link, and part of a probability of a node at an initial end of a virtual link transits to a node at an initial end of the virtual link.

As previously described, in a non-clique cluster (in other words, a cluster having a smaller number of links connecting nodes in a group, such as a cluster that is configured such that a link is used to connect one node to another node adjacent thereto), a probability transits (moves) from a given node to another node by passing through a large number of links. This is one of factors that make the iterative calculation of the stochastic process difficult to converge. Actual targets as analysis targets occasionally include non-clique clusters.

In contrast, as described with reference to the exemplary embodiment, in the iterative calculation, the addition of a virtual link allows a probability of a node to transit through a virtual link to another node that is not connected thereto via a real link. Since a probability that has transited through plural real links between two nodes may transit through a single virtual link, the probability of the node is easy to transit. The convergence of the iterative calculation is thus faster.

The virtual link is a shortcut as opposed to plural real links present between two nodes over the network, and may be interpreted as teleportation that allows a probability, which is unable to immediately reach another place (node) via a real space (a real link group), to instantaneously transit to that place (in other words, through one link).

In the above example, a virtual link is added between one node and each of all the nodes over the network. This arrangement is one example only. If a virtual link is added on at least one pair of nodes from among pairs of nodes without real link 202 over the network, probabilities are easier to be mixed by the effect of the virtual link than in the original network, and the iterative calculation is faster to converge.

The steady link probability calculating unit 144 calculates a steady link probability of a network with a virtual link added (in other words, an extension network).

The link probability correcting unit 146 corrects the steady link probability determined by the steady link probability calculating unit 144 in a setting correction method of a learning data model. The setting correction method is intended to reduce an increase in an amount of calculation involved in the addition of a virtual link.

A link along which a random walker is moving is virtually observed for the clustering calculating unit 148 to perform a calculation operation, and then predictable measurement results (also referred to as learning data or passage information) are mathematically modeled. Since the extension network including a virtual link has a large number of links (particularly if a virtual link is added to each of all the nodes), an amount of learning data to be prepared in the virtual observation also becomes higher in response to the number of links. Calculation costs used to reference the large amount of learning data in the iterative calculation of the stochastic process substantially increase. On the other hand, a network to be clustered is not the extension network with the virtual links added thereto, but the original network with the real links and without the virtual links. In accordance with the exemplary embodiment, the model of the learning data is corrected, based on the premise that the virtual observation is performed on the real link only. The correction performed on the link probability by the link probability correcting unit 146 responds to the model correction. Steady link probabilities of the real links are extracted in the correction performed by the link probability correcting unit 146, from among the steady link probabilities of the links including the virtual links, calculated by the steady link probability calculating unit 144. Since the steady link probabilities are calculated for the extension network including the virtual links, the sum of steady link probabilities of the real links as part of the extension network is not 1. For this reason, the steady link probabilities of the extracted real links, as they are, are not able to satisfy requirement of probability, and the calculation of the stochastic process is not applicable thereto. The link probability correcting unit 146 standardizes the sum of steady link probabilities of the extracted real links to be 1, and standardized values are regarded as corrected values of the steady link probabilities of the real links. Note that the steady link probability of each virtual link is set to be zero.

The clustering calculating unit 148 performs an iterative calculation of the stochastic process for clustering, using information concerning the extension network and the corrected steady link probabilities. The iterative calculation may be performed in accordance with the concept of the modular decomposition of Markov chain disclosed in Japanese Unexamined Patent Application Publication Nos. 2013-168127, 2016-029526, and 2016-218531.

A process performed by the arithmetic module 14 is described with reference to FIG. 3.

In the process, the acquisition unit 140 in the arithmetic module 14 retrieves the network information from the memory 10 (S10).

The virtual link adding unit 142 adds a virtual link to the network represented by the network information (S12). The addition of the virtual link is performed by correcting a transition probability matrix $T_{nm}$ generated in accordance with the network information into a form having the virtual link added.

The transition probability matrix $T_{nm}$ is a matrix in which a probability of an agent (in other words, a probability value that a node m has) transiting (randomly walking) from the node m to node n via a link is expressed. For example, if the agent selects one or more links branching out of a node at an equal probability, the transition probability matrix $T_{nm}$ depends on only the configuration of the network represented by the network information, namely, depends on only how the nodes are linked. The transition probability matrix $T_{nm}$ may be determined in view of information other than the network configuration (for example, in view of the importance of each node). In this case, as well, the same is true in that the transition probability matrix $T_{nm}$ also depends on the network information. Reference is made to Nos. 2013-168127, 2016-029526, and 2016-218531 for the transition probability matrix.

In a specific example, in S12, the virtual link adding unit 142 determines the transition probability matrix $T_{nm}$ (with the tilde placed on top of the letter T) of the extension network (with the virtual link added thereto) from the transition probability matrix $T_{nm}$ of the original network in accordance with the following formula (1):

$$\tilde{T}_{nm}=(1-\rho)T_{nm}+\rho/N \qquad (1)$$

N represents the number of nodes in the extension network and equals the number of nodes of the original network represented by the network information. Also, ρ is a real number higher than 1 but lower than 1, and represents a ratio of a transition of probabilities through a virtual link to the transitions of the probabilities between nodes in the extension network. If the weight (ratio ρ) of the virtual link is increased, the configuration of the network including the real links that are originally intended to be clustered is more difficult to be reflected in the calculation of the Markov chain (than in the virtual link), and this is not very much desired. For this reason, the value of ρ is set to be a relatively low value (for example, less than 0.5). The second term on the right side of formula (1) represents a component of the transition of probability through the virtual links. In this example, the second term on the right side of formula (1) means that the ratio ρ of the probability (agent) of the node m transits to all the nodes uniformly along N virtual links extending from the node m to all nodes (a total of N nodes). The first term of the right side of formula (1) represents a component transiting along real links and means that the remaining ratio (1−ρ) that results from subtracting the ratio ρ transiting along the virtual links, from the probabilities of the node m, transits in accordance with the transition probability matrix $T_{nm}$ of the original network.

Formula (1) means that the probability of a node transits along all virtual links extended from that node to be uniformly distributed. This is described for exemplary purposes only. As another example, the following formula (2) may be used:

$$\tilde{T}_{nm}=(1-\rho)T_{nm}+\rho\Sigma_m W_{nm}/\Sigma_{n,n} W_{nm} \qquad (2)$$

$W_{nm}$ is an adjacency matrix of the network, having N rows and N columns. If there is a real link between a node m and a node n, $W_{nm}=1$, and if there is not a real link between the node m and the node n, $W_{nm}=0$. In formula (1), part of the ratio ρ that transits along the virtual link, out of the probabilities of the node m, and is uniformly distributed to all the virtual links originated at the node m as an initial end. In contrast, in formula (2), part of the ratio ρ is distributed at a higher ratio to a virtual link to the node n having a higher number of real links to other nodes (in other words, the node n is more popular among the nodes).

In yet another example, the transition probability matrix of the extension network is determined in accordance with the following formula (3):

$$\tilde{T} = (1-\rho)T_{nm} + \rho \frac{f(p_n)}{\sum_{m=1}^{N} f(p_m)} \qquad (3)$$

The left side of formula (3) represents the transition probability matrix $T_{nm}$ of the extension network to be determined (with the tilde symbol on top of the letter T). A function f(x) on the right side may be any function as long as it is a monotonously increasing function with a variable x. In formula (3), part of the ratio ρ that transits along the virtual links, out of the probabilities of the node m, is distributed at a higher ratio to the node n having a higher probability.

The steady link probability calculating unit 144 calculates the steady link probability (S14).

In this calculation operation, the steady link probability calculating unit 144 calculates the probability of each node in the steady state of the probability transition (random walk) in the extension network (the node probability in the steady state) using the transition probability matrix $T_{nm}$ (with the tilde) of the extension network determined in step S12. In the calculation operation, the operation indicated by the following formula (4) is iterated until the steady state:

$$p_t(n)=\Sigma_{m=1}^{N}\tilde{T}_{nm}p_{t-1}(m) \qquad (4)$$

In formula (4), $p_t(n)$ represents the probability of the node n at discrete time t (the probability that a random walker is present at that node).

The operation represented by formula (4) is iterated. The value of $p_t(n)$ in the steady state is the node probability $p^{stead}(n)$ of the node n in the steady state.

The steady link probability calculating unit 144 calculates the link probability in the steady state from the node probability $p^{stead}(n)$ of each node n in the steady state in accordance with the following formula (5):

$$\tilde{p}_l^{stead}=T(\text{terminal end of link } l|\text{initial end of link } l)p^{stead}(\text{initial end of link } l) \qquad (5)$$

The link probability is determined by multiplying the node probability $p_t(n)$ of the node n by the transition probability of a link l extending from the node n. The link probability of the link l in the steady state (the left side of formula (5)) is determined by multiplying the node probability of the node at the initial end of the link l in the steady state by the transition probability of the link l from the node at the initial end to the node at the terminal end of the link l. The transition probability matrix T used herein is not the one extended by the addition of the virtual link in S10 but the original transition probability matrix T prior to the addition of the virtual links. The node probability of each node is calculated using the extension network including the virtual links. The link probability determined from the node probability is calculated for the real links l only. The sum of the link probabilities of the real links l thus calculated is not 1, and does not satisfy the requirement of probability.

The link probability correcting unit 146 corrects the steady link probability of each real link determined in S12 in accordance with a correction of a learning data model (S16). The correction is performed in accordance with the following formula (6):

$$\tilde{p}_l^{stead}=p_l^{stead}/\Sigma_l p_l^{stead} \qquad (6)$$

In this calculation operation subsequent to the correction, the steady link probability of the virtual link is treated as zero.

The clustering calculating unit 148 performs an iterative calculation for clustering using data generated heretofore. In this example, the calculation method of the modular decomposition of the Markov chain similar to the calculation method disclosed in Japanese Unexamined Patent Application Publication Nos. 2016-029526 and 2016-218531 is used. The calculation method described below is slightly different from the calculation method of the modular decomposition of the Markov chain disclosed in Japanese Unexamined Patent Application Publication Nos. 2016-029526 and 2016-218531, but the basic concept remains unchanged from the related art technique.

According to Japanese Unexamined Patent Application Publication Nos. 2016-029526, and 2016-218531, the learning data used is passage information $\tau^{(d)}(k)$ that is observation data obtained through D rounds of virtual observations (round number d is an integer from 1 to D, and k is a cluster number (community number)). In an example described below, passage information of a real link l is used instead of $\tau^{(d)}(k)$ under the adequate assumption that D is sufficiently larger (much larger than the number of nodes N). The passage information of the real link l is expressed by the following formula (7):

$$\tilde{\tau}_n^{(l)} = \delta_{n, \text{terminal end of link } l} + \delta_{n, \text{initial end of link } l} \quad (l=1,\ldots,\hat{l}) \quad (7)$$

In formula (7), n represents the identification number of a node, and $\delta$ represents a Kronecker delta. More specifically, if the node n matches the terminal node or the initial node of the real link l thereof, the passage information (learning data) related to the real link l of the node n defined by formula (7) is 1; otherwise, the passage information is 0.

In this example, a ratio $\tilde{\gamma}_{lk}$ (with the tilde) defined by formula (III) described below related to the real link l is used in place of the ratio $\gamma^{(d)}(k)$ of a cluster k to all clusters (components) at each round (represented by the round number d) of the virtual observations as described in Japanese Unexamined Patent Application Publication No. 2016-029526.

By substituting a real link number l for the round number d of observations, the sum of functions is re-written as expressed below:

$$\Sigma_{d=1}^D f(d) \to D \Sigma_{l=1}^L \tilde{p}_l^{\text{stead}} \tilde{f}(l) \quad (8)$$

The second term of the right side of formula (I) described below is obtained by performing such a substitution operation on a similar formula described in Japanese Unexamined Patent Application Publication No. 2016-029526.

Turning to the discussion of the process of FIG. 3, the clustering calculating unit 148 tentatively determines initial values of a classification ratio $p_t(n|k)$, a degree of importance $\pi_k^{new}$, and a ratio $\tilde{\gamma}_{lk}$ (with the tilde), and initializes a count g as the number of iterations to be zero (S18). The classification ratio $p_t(n|k)$ represents a ratio (degree) at which the node n is classified to be in a cluster k. The degree of importance $\pi_k^{new}$ is the degree of importance of the cluster k.

The clustering calculating unit 148 performs the iterative calculation of expectation and maximization (EM) in accordance with the following formulas (I), (II), and (III).

$$p_t(n|k) = \frac{\tilde{\alpha}}{\tilde{\alpha}+\pi_k} \sum_{m=1}^N \tilde{T}_{nm} p_{t-1}(m|k) + \frac{1}{\tilde{\alpha}+\pi_k} \frac{1}{2} \sum_{l=1}^L \tilde{p}_l \tilde{\gamma}_l \tilde{\tau}_n^{(l)} \quad (I)$$

$$\pi_k = \sum_{l=1}^L \tilde{p}_l \tilde{\gamma}_{lk} \quad (II)$$

where $$\tilde{\alpha} = \frac{\alpha}{2D}.$$

$$\tilde{\gamma}_{lk} = \frac{\pi_k \prod_{n=1}^N [p_t(n|k)]^{\tilde{\tau}_n^{(l)}}}{\sum_{k=1}^K \pi_k \prod_{n=1}^N [p_t(n|k)]^{\tilde{\tau}_n^{(l)}}} \quad (III)$$

The clustering calculating unit 148 calculates the ratio $\tilde{\gamma}_{lk}$ (with the tilde) in accordance with formula (III) (S20). The initial values determined in S18 are used in the first cycle of the calculation.

The clustering calculating unit 148 substitutes current classification ratio $p_t(n|k)$, and degree of importance $\pi_k^{new}$ for the classification ratio $p_{t-1}(n|k)$, and the degree of importance $\pi_k^{old}$ at a segment of time earlier (S22). In accordance with formulas (I) and (II), the clustering calculating unit 148 calculates the classification ratio $p_t(n|k)$, and the degree of importance $\pi_k^{new}$ (S24). Here, a is a positive real number, is a parameter that determines the size of each cluster, and may be a predetermined value.

The clustering calculating unit 148 increments the count g representing the number of iterative calculations by 1 (S26), and determines whether the count g has reached a predetermined value G (S28). If the count g has not reached the predetermined value G, steps S20 through S26 are iterated. The value G represents the number of iterations performed until the calculation through steps S20 through S24 converges in the calculation method of the exemplary embodiment. The value G is determined in advance through experiments or using empirical knowledge. The technique of the exemplary embodiment of adding a virtual link (teleportation) allows the iterative calculations to converge faster than related art techniques free from adding the virtual link (such as disclosed in Japanese Unexamined Patent Application Publication Nos. 2013-168127, 2016-029526, and 2016-218531), and may thus use the value G smaller than that in the related art.

If the clustering calculating unit 148 determines in S28 that the count g has reached the value G, the clustering calculating unit 148 ends the process, based on the premise that the iterative calculations have been completed. The classification ratio $p_t(n|k)$, and degree of importance $\pi_k$ thus obtained indicate the soft clustering results of the original network as in the process disclosed in Japanese Unexamined Patent Application Publication Nos. 2016-029526 and 2016-218531.

Rather than performing the method of FIG. 3, the clustering calculating unit 148 performs in the convergence determination in S28 determines that the iterative calculations have been completed if an amount of change in an evaluation value $Q_t$ at each iteration shifts to a smaller value (smaller than a threshold value) as described with reference to Japanese Unexamined Patent Application Publication Nos. 2013-168127, 2016-029526, and 2016-218531.

The process described with reference to FIG. 3 employs a method similar to the calculation method disclosed in Japanese Unexamined Patent Application Publication Nos. 2016-029526 and 2016-218531. The process of the exemplary embodiment of adding the virtual link (teleportation) is applicable when the calculation method disclosed in Japanese Unexamined Patent Application Publication No. 2013-168127 is used. The technique disclosed in each of Japanese Unexamined Patent Application Publication Nos. 2013-168127, 2016-029526, and 2016-218531 treats the transition of the probability between the nodes in the network as a discrete Markov chain. Rather than using the discrete Markov chain, a calculation method based on the continuous Markov process, such as a continuous time master equation, may be used. In such a case, the technique of the exemplary embodiment of adding the virtual link (teleportation) may be used.

The exemplary embodiment of the present invention has been described. The image processing apparatus 1 may be implemented by causing a computer to execute a program that represents the functionalities of the elements described above. The computer may include a hardware circuit configuration. The hardware circuit configuration includes a microprocessor, such as a central processing unit, a random-access memory (RAM), a read-only memory (ROM), a controller that controls fixed storage devices including a flash memory, a solid-state drive (SSD), and a hard disk drive (HDD), a variety of input and output interfaces, a network interface that controls connection with a network, such as a local-area network, and a bus that interconnects these elements. The program in which process content of each element is described is stored on the fixed storage device, such as a flash memory, via the network or the like, and then installed on the computer. When the program stored on the fixed storage device is read onto the RAM, and then executed by the microprocessor, such as a CPU, the functional modules described above are implemented.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for processing information, the process comprising:
   acquiring information related to a network including a group of nodes, and a group of real links that connect the nodes;
   generating an extension network by adding to the network at least a virtual link that links nodes that are not linked by a real link;
   generating and determining a transition probability matrix of the generated extension network, the transition probability matrix determining a probability of a uniform distribution of a signal transiting from each node through each virtual link connected to the respective node; and
   clustering the group of the nodes by iteratively calculating a stochastic process of a transition between the nodes linked by the real link and the virtual link in the extension network until the stochastic process is in a steady state.

2. The non-transitory computer readable medium according to claim 1, wherein the clustering includes:
   calculating a link probability of each of the real links and the virtual link, based on a steady state of a transition of a probability between the nodes in the extension network,
   extracting and standardizing link probabilities related to only the real links out of the calculated link probabilities, and
   calculating the stochastic process using the link probability of the real link subsequent to the standardizing.

3. An information processing apparatus comprising:
   a processor programmed to:
      acquire information related to a network including a group of nodes, and a group of real links that connects the nodes;
      generate an extension network by adding to the network at least a virtual link that link nodes of the group of nodes that are not linked by a real link of the group of real links;
      generate and determine a transition probability matrix of the generated extension network, the transition probability matrix determining a probability of a uniform distribution of a signal transiting from each node through each virtual link connected to the respective node; and
      cluster the group of the nodes by iteratively calculating a stochastic process of a transition between the nodes linked by the real link and the virtual link in the extension network until the stochastic process is in a steady state.

4. An information processing method comprising:
   acquiring information related to a network including a group of nodes, and a group of real links that connect the nodes;
   generating an extension network by adding to the network at least a virtual link that links nodes of the group of nodes that are not linked by a real link of the group of links;
   generating and determining a transition probability matrix of the generated extension network, the transition probability matrix determining a probability of a uniform distribution of a signal transiting from each node through each virtual link connected to the respective node; and
   clustering the group of the nodes by iteratively calculating a stochastic process of a transition between the nodes linked by the real link and the virtual link in the extension network until the stochastic process is in a steady state.

* * * * *